(No Model.)

R. L. LUNSFORD.
LOCK NUT.

No. 578,412.   Patented Mar. 9, 1897.

WITNESSES:
John Buckler,
C Gerst

INVENTOR
Robert L. Lunsford,
BY
Edgar Tate & Co
ATTORNEYS.

UNITED STATES PATENT OFFICE.

ROBERT LEE LUNSFORD, OF SAVANNAH, GEORGIA.

LOCK-NUT.

SPECIFICATION forming part of Letters Patent No. 578,412, dated March 9, 1897.

Application filed April 22, 1896. Serial No. 588,615. (No model.)

*To all whom it may concern:*

Be it known that I, ROBERT LEE LUNSFORD, a citizen of the United States, and a resident of Savannah, in the county of Chatham and State of Georgia, have invented certain new and useful Improvements in Lock-Nuts, of which the following is a specification, reference being had to the accompanying drawings, forming a part thereof, in which similar letters of reference indicate corresponding parts.

This invention relates to lock-nuts, and particularly to means for locking or securing a vehicle-nut to the spindle thereof, so as to prevent the wheel from coming off in the operation of the vehicle; and the object thereof is to provide an effective device of this class which is simple in construction and operation and which, while being perfectly adapted to accomplish the result for which it is intended, is also comparatively inexpensive.

The invention is fully disclosed in the following specification, of which the accompanying drawings form a part, in which—

Figure 1:
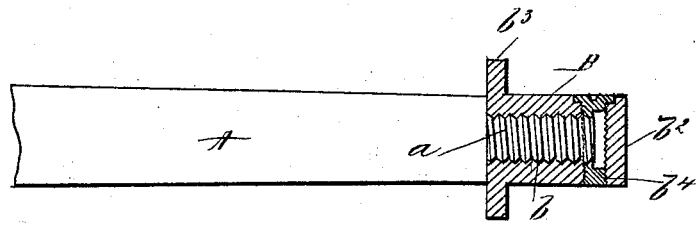
Figure 2:
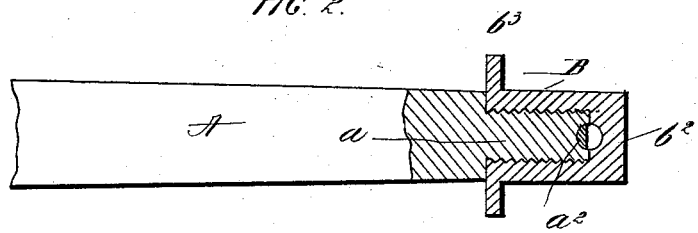
Figure 3:
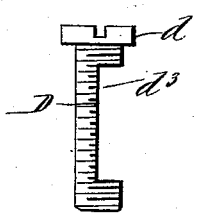
Figure 4:
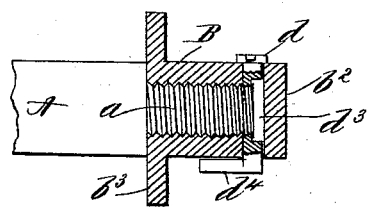

Figure 1 is a view of a portion of a spindle of a vehicle provided with my improved nut and lock, the latter being shown in section; Fig. 2, a similar view showing a modified form of construction; Fig. 3, a side view of a locking-bolt which I employ, and Fig. 4 is a sectional view of a modified form of construction.

In the drawings forming part of this specification, A represents the spindle of a vehicle or part thereof, which is provided with a screw-threaded extension $a$, and the end of the screw-threaded extension $a$ is provided with a transverse groove $a^2$, which is semicircular in cross-section; and I also provide a nut B, which is provided with a central screw-threaded bore $b$, which is open at the inner end and closed at the outer end, as shown at $b^2$, and the inner end of the nut B is preferably provided with an annular flange or rim $b^3$.

Formed transversely in the nut B and near the outer end thereof is a bore $b^4$, which is screw-threaded, and I also employ a bolt D, provided with a head $d$, said bolt being screw-threaded and being provided in one side thereof with an oblong rectangular cavity or recess $d^3$, and the operation will be readily understood from the foregoing description when taken in connection with the accompanying drawings and the following statement thereof.

In practice the wheel is first placed upon the spindle and the nut B is screwed into position, as shown in Figs. 1 and 2. The bolt B is then screwed into the transverse bore $b^4$, and when turned so that the side thereof will enter the transverse groove $a^2$ in the end of the spindle the nut cannot be removed. When it is desired to remove the nut and the wheel, the bolt D must be turned so that the side thereof will not rest in the transverse groove $a^2$ of the screw-threaded extension $a$, and in this position of the bolt the nut can be removed, as will be readily understood.

This device is simple in construction and operation and perfectly adapted to accomplish the result for which it is intended, and, if desired, the head $d$ of the bolt D may be countersunk in the side of the nut, as shown in Fig. 1.

In the construction shown in Fig. 4 the lock-bolt D is not screw-threaded, but is provided at one end with a crank $d^4$ and at the other with a head $d^5$, and the crank $d^4$ at the opposite end may be movable, if desired, so that the said pin may be pushed into position and then the said crank-head secured, and this construction is preferable in some cases to that shown in Figs. 1, 2, and 3, as it will be apparent that the cost thereof will be less than when the lock-bolt is screw-threaded.

My invention is not limited to the position of the bore $b^4$ nor to the form of the nut B, and I reserve the right to make all such alterations in and modifications of the construction herein described as fairly come within the scope of the invention.

It will also be apparent that my improved nut may be applied to rods, bars, and other devices, as well as to the spindles of vehicles; and, Having fully described my invention, I claim as new and desire to secure by Letters Patent—

1. In the combination of a spindle-rod having a screw-threaded extension, said extension being provided at its outer end with a transverse, semicircular groove, of a nut having a central bore therein and being adapted to engage said screw-threaded extension, said nut having its outer end closed and inner end open, said nut also having therein a transverse bore of corresponding size to said groove, of a locking-bolt adapted to enter said bore and snugly fit in said groove, and said bolt having an oblong rectangular cavity therein, substantially as and for the purposes described.

2. A nut-locking device having a spindle, a screw-threaded extension on said spindle, a nut with a central bore and having its outer end closed and inner end opened, adapted to engage said extension, said extension being provided on its outer end with a semicircular groove and said nut having near its outer end a transversely-extending circular bore of corresponding size to said groove, a locking-bolt having an oblong rectangular cavity therein and being adapted to snugly fit in said transversely-extending bore and groove, all of said parts being combined substantially as described.

3. In a nut-lock, a spindle, a screw-threaded extension thereon having a transversely-extending semicircular groove in the end thereof, a nut having a central bore, closed outer and open inner ends, outwardly-extending flange on said inner end, a transversely-extending bore near said outer end, a circular-shaped bolt adapted to snugly fit in said transversely-extending bore and groove and having an oblong rectangular cavity therein, and a crank adapted to engage one end of said bolt, all of said parts being combined substantially as described.

In testimony that I claim the foregoing as my invention I have signed my name, in presence of the subscribing witnesses, this 14th day of April, 1896.

ROBERT LEE LUNSFORD.

Witnesses:
WM. H. LEOPOLD,
JACOB GAZAN.